(12) United States Patent
Joedicke

(10) Patent No.: US 6,838,152 B2
(45) Date of Patent: Jan. 4, 2005

(54) LOW PIGMENTS COSTS ALGAE-RETARDANT ROOFING GRANULE PRODUCTS CONTAINING METALLIC COPPER

(75) Inventor: Ingo B. Joedicke, Falling Waters, WV (US)

(73) Assignee: ISP Investments Inc., Wilmington, DE (US)

( * ) Notice: Subject to any disclaimer, the term of this patent is extended or adjusted under 35 U.S.C. 154(b) by 176 days.

(21) Appl. No.: 10/347,978

(22) Filed: Jan. 21, 2003

(65) Prior Publication Data

US 2004/0139886 A1 Jul. 22, 2004

(51) Int. Cl.$^7$ .............................. B32B 5/16; B05D 1/24
(52) U.S. Cl. .................. 428/145; 428/149; 428/150; 428/328; 428/331; 428/403; 428/404; 52/518; 427/186; 427/192; 427/202; 427/204; 427/205; 427/215; 427/219
(58) Field of Search ................................ 428/145, 149, 428/150, 328, 331, 403, 404; 427/186, 191, 192, 202, 204, 205, 214, 215, 219; 52/518

(56) References Cited

U.S. PATENT DOCUMENTS

| | | | |
|---|---|---|---|
| 2,001,448 A | 5/1935 | Beasley | 91/70 |
| RE20,295 E | 3/1937 | Fisher | 91/70 |
| 2,142,540 A | 1/1939 | Veazey | 91/70 |
| 2,695,851 A | 11/1954 | Lodge | 117/27 |
| 2,732,311 A | 1/1956 | Hartwright | 117/27 |
| 2,898,232 A | 8/1959 | Miller et al. | 117/100 |
| 2,981,636 A | 4/1961 | Lodge et al. | 117/70 |
| 2,996,476 A | 5/1961 | Larson | 117/100 |
| 3,479,201 A | 11/1969 | Sloan | 117/27 |
| 3,494,727 A | 2/1970 | Rapaport | 21/61 |
| 3,507,676 A | 4/1970 | McMahon | 117/27 |
| 3,528,842 A | 9/1970 | Skadulis | 117/27 |
| 3,560,196 A | 2/1971 | Horai et al. | 71/115 |
| 3,598,627 A | 8/1971 | Klimboff | 117/25 |
| 3,884,706 A | 5/1975 | Little | 106/15 |
| 3,888,176 A | 6/1975 | Horai et al. | 106/15 |
| 3,888,682 A | 6/1975 | Nelson | 106/15 |
| 3,888,683 A | 6/1975 | Horai et al. | 106/15 |
| 3,888,684 A | 6/1975 | Little | 106/15 |
| 3,894,877 A | 7/1975 | Nelson | 106/18 |
| 3,998,644 A | 12/1976 | Lodge | 106/15 |
| 4,092,441 A | 5/1978 | Meyer et al. | 427/37 |
| 4,359,505 A * | 11/1982 | Joedicke | 428/404 |
| 5,356,664 A | 10/1994 | Narayan et al. | 427/186 |
| 5,382,475 A | 1/1995 | Kayser | 428/403 |
| 5,411,803 A | 5/1995 | George et al. | 428/403 |
| 6,214,466 B1 | 4/2001 | Joedicke | 428/404 |
| 6,235,372 B1 * | 5/2001 | Joedicke | 428/145 |
| 6,548,145 B2 * | 4/2003 | Joedicke | 428/145 |
| 6,607,781 B2 * | 8/2003 | Joedicke | 427/186 |

* cited by examiner

Primary Examiner—H. Thi Le
(74) Attorney, Agent, or Firm—William J. Davis; Imre Balogh

(57) ABSTRACT

Algae-resistant roofing granules consisting of one or two coats of a fired semi-ceramic composition having a metallic copper powder which does not significantly affect the color tint strength of the pigment contained in the coatings.

16 Claims, 2 Drawing Sheets

LOW PIGMENTS COSTS ALGAE-RETARDANT ROOFING GRANULE PRODUCTS CONTAINING METALLIC COPPER

BACKGROUND OF THE INVENTION

1. Field of the Invention

The present invention relates to algae-resistant roofing granules. More particularly, it relates to colored roofing granules containing metallic copper powder that resists discoloration by terrestrial algae.

2. Reported Development

Roofing granules, both natural and artificially color-coated granules, are extensively used in roll roofing and asphalt shingle compositions. The roofing granules are typically embedded in the asphalt coating on the surface of an asphalt-impregnated felt base material, the granules thus forming a coating that provides a weather-resistant exterior roofing surface. In addition to its utility, the granule coating also provides an aesthetic effect observable with respect to the coating composition, the appearance of the granules is of major marketing interest. For this reason a pigmented color coating is ordinarily applied to the base mineral granules to enhance their visual, decorative effect. The method of providing artificially colored roofing granules involves crushing and screening minerals and applying to the so-obtained granules a coating containing the desired pigment. The granules and the pigment are bonded together by using a soluble silicate binder solution which is then insolubilized by heat treatment alone or by chemical action to a water-insoluble state. The function of the soluble silicate is to first uniformly distribute and encapsulate the pigment within the coating matrix and then to bind the pigment and granules together when the silicate is insolubilized.

The soluble silicate binder is converted to an insoluble state by heat treatment as in the case of a silicate/clay coating matrix or by a combination of heat treatment and chemical action such as by the addition of an acidic material to the fired soluble silicate.

Examplary references directed to the production of artificially colored granules and stabilizing the pigment therein are as follows.

U.S. Pat. No. Re. 20,295 describes artificially colored roofing granules produced by: depositing on granular mineral matter a metal salt followed by the addition of a soluble silicate which will react to form an insoluble metal glass; and subjecting the insoluble metal glass to heat in order to fuse the metal silicate on the granules.

U.S. Pat. No. 2,001,448 describes a method of producing artificially colored granules by the steps of: providing base particles, such as sand, gravel, rock, blast-furnace slags, or burned clay or shale and crushed brick; mixing the particles with a hydrous plastic clay in either wet or dry condition so that the clay coats the exterior surfaces of the particles; adding a suitable color pigment to coat the particles therewith; drying the particles; adding silicate of soda either per se or with a coloring pigment therein to react with the clay coating covering the particles; and heating the particles to a temperature of about 450° to 1200° F. to fuse together the coatings and the particles.

U.S. Pat. No. 2,695,851, describes artificially colored roofing granules and a method for producing them. The method comprises: forming on the base granules a coating of film-forming composition which contains a pigment, an alkali silicate solution, finely-divided hydrated alumina, and an insolubilizing agent comprising of clay, cryolite, feldspar, aluminum fluoride and sodium fluorosilicate; and heating the so-obtained granules to about 1000° F.

The hydrated alumina used in combination with a light-colored, opaque pigment, such as titanium dioxide produces lighter and brighter granules than can be produced with titanium dioxide in the absence of hydrated alumina.

U.S. Pat. No. 2,732,311 is directed to a coating process for producing radiation-reflective roofing granules.

In the process the raw granules are mixed with a clay-like material, such as kaolin at a temperature below 100° F., preferably at room temperature. A solution of sodium silicate is added to the mixture. Alternatively, the clay and sodium silicate can be pre-mixed then applied to the granules. The granules are then partially air-dried to develop a tacky film on the granules. When the proper viscous tacky film has been formed, aluminum flakes are then added to the mixture and are caused to adhere to the coated granules by further mixing. Instead of aluminum flakes, copper flakes, brass flakes, or metallic particles known as bronze powders and aluminum bronze may be used. The metal flake-coated granules are then fired at a temperature of about 900° to 1000° F.

U.S. Pat. No. 2,981,636 describes artificially colored roofing granules and a method for their preparation. The method of producing the colored roofing granules involves the steps of:

mixing the cleaned and heated granules with an aqueous solution of sodium silicate; drying and dehydrating the mixture of granules and the aqueous solution; and adding an insolubilizing agent containing a desired pigment therein to the dehydrated granules.

The insolubilizing agent is a mixture of aluminum chloride and ammonium chloride, however, other insolubilizing agents may also be used, such as aluminum sulfate, magnesium chloride, zinc chloride, and hydrochloric acid.

U.S. Pat. No. 3,494,727 discloses a microbe resistant roof wherein the roofing material contains embedded therein visually observable metallic chips, such as copper, lead, zinc and iron.

U.S. Pat. No. 3,507,676 discloses zinc-containing coating for roofing granules in the form of zinc, ZnO or ZnS.

U.S. Pat. No. 3,528,842 discloses copper compound-containing algicidal surfacing, the copper compound being cuprous oxide or cuprous bromide.

U.S. Pat. No. 3,598,627 discloses fungus-resistant shingles the outside surface of which are asphalt coated and are covered by a hard, granular weathering material and granular zinc.

U.S. Pat. No. 3,884,706 discloses algicidal roofing granules coated with a substantially water insoluble silicate-clay coating into which small amounts of algicides, e.g. 0.05% to 0.5% zinc algicide and 0.05% to 0.5% copper algicide, are incorporated based on the total weight of the roofing granules.

U.S. Pat. No. 4,092,441 discloses roofing granule treatment by coating the granules with a metallic algicide, such as zinc, copper, nickel and mixtures thereof. The metals are sprayed onto the granules in the form of molten droplets.

U.S. Pat. No. 5,382,475 discloses algicidal granules having a ceramic coating thereon comprising three layers, the first two of which have a copper compound, and the third layer has a pigment, a borate compound and zinc oxide.

U.S. Pat. No. 3,894,877 discloses incorporating copper silicate into color coated roofing granules using a heavy processing oil. The copper silicate adheres to the surface of the granule color coating with the finer particles thereof being adsorbed into the color coat with the processing oil.

U.S. Pat. No. 6,214,466 discloses algae-resistant roofing granules coated with: a first coat consisting of a fired silicate-clay matrix containing cuprous oxide and zinc sulfide to provide a slow, long-term bimetallic copper and zinc ions release; and a second coat consisting of a fired silicate-clay matrix containing a pigment.

An object of the present invention is to provide algae-retardant, artificially colored roofing granules.

Another object of the present invention is to enhance algicidal activity of the algicide-containing artificially colored roofing granules.

Still another object of the present invention is to reduce the cost of producing algae-resistant, long-term and slow-release algicide-containing granules.

SUMMARY OF THE INVENTION

In accordance with the present invention algae-resistant roofing granules having an enhanced ability, over an extended period of time, to release algidical ions to prevent or inhibit the growth of algae and fungi upon atmospheric exposure of roofing surfaces coated with such granules. The algae-resistant roofing granules comprising:

a) a base of crushed mineral aggregate coated with b) a single layer of semi-ceramic composition consisting of a fired silicate-clay matrix containing: of from about 0.0 to about 25 pounds, and preferably 0.5 to 20 pounds, of pigment, and of from about 2 pounds to about 20 pounds, and preferably 7 pounds to 13 pounds of metallic copper powder having a particle size range of from about 5 to about 75 microns.

The algae-resistant roofing granules of the present invention may contain two coatings thereon, the roofing granules comprising:

a) a base of crushed mineral aggregate coated with b) a first or inner layer of semi-ceramic composition consisting of a fired silicate-clay matrix containing: of from about 0.0 to about 25 pounds, and preferably 0.5 to 20 pounds, of pigment; and of from about 0.0 pounds to about 20 pounds, and preferably 5 pounds to 15 pounds of metallic copper powder having a particle size range of from about 5 to about 75 microns, and preferably 5 to 50 microns with an average particle size of 33 microns;

c) a second or outer layer of semi-ceramic composition, coated on the first or inner layer of the semi-ceramic composition, consisting of a fired silicate-clay matrix containing coloring pigments that determine the overall appearance of the granules, and metallic copper powder uniformly distributed in the fired silicate-clay matrix in an amount ranging from 0.0 pounds to about 20 pounds, and preferably about 5.0 pounds to 15.0 pounds having a particle size range of from about 5 to about 75 microns, and preferably 5 to 50 microns with an average particle size of 33 microns.

DETAILED DESCRIPTION OF THE INVENTION

Figure 1:
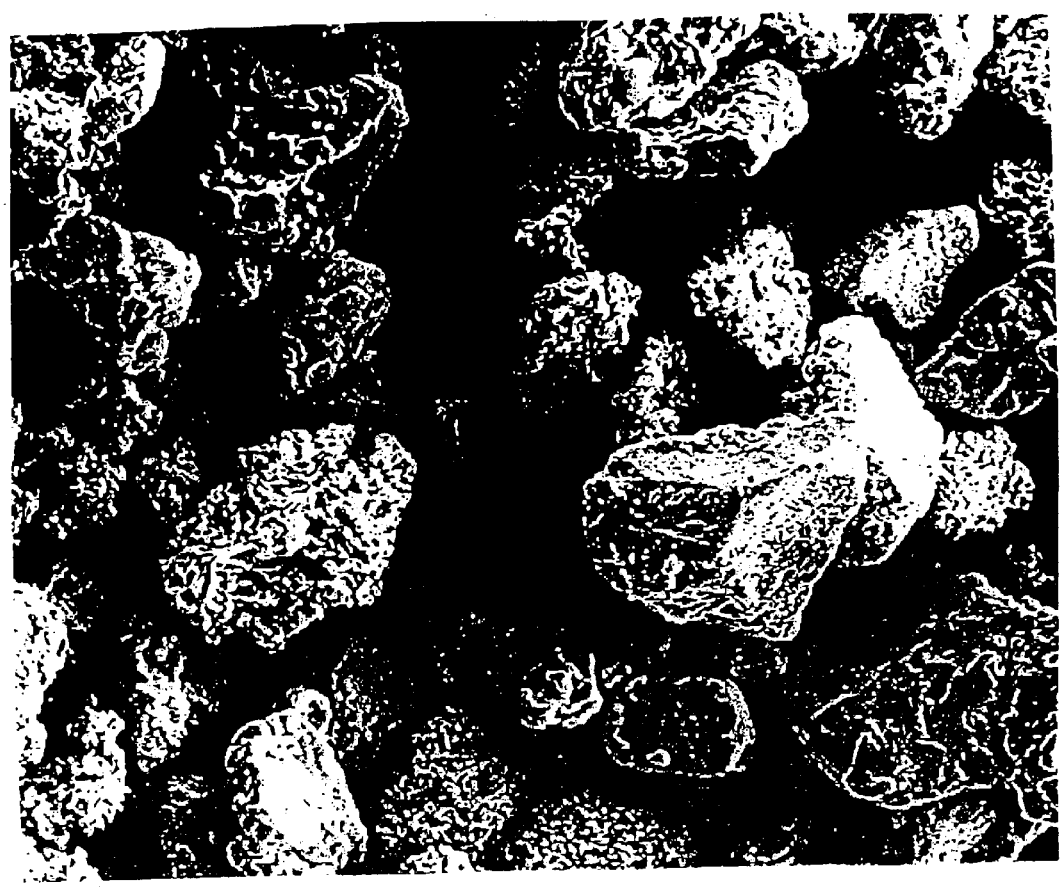
FIG. 1 shows a scanning electron micrograph of copper metal powder aggregates.

Mineral-surfaced asphalt shingle roofing can support the growth of discoloring algae, most commonly the blue-green type, Cyanobacteria. Such roofs can develop spots of algae colonies within two to three years of exposure, particularly in the southeastern Gulf States, as a result of inoculation by air-born desiccated cells. These spots gradually grow into unsightly streaks as rain washes cells down the roof. In severe cases with the passage of time, this discoloration will eventually overtake the entire roof.

In addition to being unsightly, algae discoloration reduces the reflectivity of light-colored asphalt shingles and thus increases their peak daytime temperatures. This discoloration can also reduce the effective service life of the roof. Although algae discoloration can be removed by cleaning, the process of removal is costly and has to be repeated every few years. Repeated cleaning also tends to damage the surface of the mineral-surfaced asphalt shingles. A more effective and economical approach is to utilize algae-retardant roofing granules as a component of the asphalt shingles to prevent the growth of discoloring algae.

Algae-retardant granules currently available to the building industry include those in which a substantial loading of cuprous oxide, by itself or in combination with zinc compounds, is incorporated in some of the semi-ceramic coatings that encapsulate crushed rock based granules. A multi-coat coloring process is used in which the copper/zinc compounds are generally incorporated in the inner coating. Inorganic pigments, which determine the overall product color, are incorporated predominantly in the outer coating. Because of their high copper/zinc content, these products are designed to be blended with standard granules which do not contain copper/zinc. Typically, 10% of copper/zinc containing granules are blended with 90% standard granules to provide a continuous release of algicidal copper/zinc ions in the presence of atmospheric moisture. The copper/zinc content of these algae-retardant products is high enough to theoretically provide a toxic metal ion leach rate that should ideally protect the entire blend of granules of the mineral-surfaced shingle from algae discoloration. Each algae-retardant granules is supposed to create a "halo effect" of protection such that each algae-retardant granule protects nine non-algae-retardant granules, on the average, in a 10% blend. However, achievement of sustained long-term performance with this approach requires: (1) uniform blending of algae-retardant granules with standard non-algae-retardant granules to minimize the size of the protective zone provided by the algae-retardant granules, and (2) ideal moisture conditions such that the copper/zinc ions are effectively leached from the algae-retardant granules, transferred to the non-algae-retardant granules, and maintained at residual levels that are high enough to be toxic to algae over an extended period of time.

Although the copper/zinc ions released from these conventional algae-retardant granules generally protect against algae discoloration, transfer of an effective amount of copper/zinc ions to the standard granules, which make up 90% of the blend, is often insufficient. This often results in premature failure of the exposed granule-surfaced shingle with the appearance of unsightly discoloration.

Manufacture of conventional algae-retardant granules containing a high loading of cuprous oxide is currently difficult due to the dark color of the cuprous oxide. Typical coatings contain loadings in the range of 80 to 120 pounds cuprous oxide per ton of finished algae-retardant granules. Manufacture of algae-retardant granules of color other than that of the cuprous oxide itself requires that the cuprous oxide be predominantly put into the inner coatings of these multi-coat algae-retardant products to minimize the pigment cost of the outer coat. In addition, the outer coat acts as a barrier to copper migration and significantly limits the rate of copper ion release from these products.

The present invention is directed to roofing granules of artificially-colored mineral aggregates containing a slow-release copper algicide as a component of the standard colored coating. The colored coatings, either of the single-coat or two-coat type, contains both the copper algicide and the pigments that determine the overall color of the product. The copper algicide employed is a unique metallic copper powder consisting of irregularly-shaped particles produced by a copper atomization/oxidation and cuprous oxide/hydrogen reduction process. This copper powder has minimal color contribution and does not significantly affect the pigment requirements, and hence the cost, of the colored granule coating. This means that both the copper algicide and color-determining pigments can be present in the same coating. Single-coat dark products will have copper uniformly distributed throughout the coating. Two-coat light products will have the copper distributed uniformly throughout both coatings. As a result, a complete algae-resistant colored roofing granule product line can be manufactured. This eliminates the need to blend algae-retardant granules with non-algicidal standard granules. This represents an advance in the art by also eliminating the need to transfer algicidal metal ions to create a "halo effect" or protective zone in which each algae-retardant granule in a 10% blend must protect, on the average, nine standard granules.

The granules of the present invention are for the purpose of coating roofing shingles which typically comprise materials, such as felt and fiberglass to which asphalt is applied to permeate the felt or fiberglass. Over the impregnated felt or fiberglass the mineral granules of the present invention are applied. The raw materials of the granules are obtained from natural base rocks, such as greenstone, rhyolite, andesite, basalt, nephaline cyanite, and the like.

The components of the algae-resistant roofing granules of the present invention comprise the following.

1) A base of crushed mineral aggregate suitable for roofing granule manufacture.
2) Coating, either single or two-coat layer, of a semi-ceramic composition consisting of a fired silicate clay matrix containing a unique metallic copper powder as a source of slow-release copper, and conventional high-temperature inorganic pigments as is common in the art for manufacturing dark-colored granules. The unique metallic copper powder consists of irregularly-shaped particles produced by a copper atomization/oxidation and cuprous oxide/hydrogen reduction process.
3) In the case of light-colored roofing granules, e.g. whites and buffs, two-coat processing is preferably employed. In this case, a primer coating is first applied followed by a more heavily pigmented coating in order to optimize coverage and reduce overall coloring costs. In this case, two consecutive fired silicate-clay coatings are applied and the unique copper powder is incorporated in either or both coatings. Incorporation of all the copper powder in the outer coating is preferred since it gives the most effective rate of copper release due to atmospheric conditions.
4) The amount of the unique metallic copper powder present in the coating of the present invention ranges from about 2 pounds to 20 pounds, and preferably 7 pounds to 13 pounds per ton of the granules.
5) Optionally, a combination of the unique metallic copper powder and zinc compounds, such as metallic zinc powder, zinc oxide, zinc sulfide can be employed as a source of bimetallic slow-release copper and zinc. When employed in conjunction with the copper powder, the zinc compounds are present in amounts ranging from 0 to 20 pounds per ton of the granules, and can be incorporated in either the single-coat or the two-coat products in either or both coatings.

The process of manufacturing the roofing granules of the present invention is as follows.

Roofing Granules

1) Crushing and sizing the base mineral aggregates to the desired size, typically to No. 11 grading, and preheating the sized granules to about 210° F. to 230° F.
2) For dark-colored granules typically made be a single-coat coloring process, the preheated granules are then coated with an algicidal, pigmented, semi-ceramic composition, typically comprising the following expressed in pounds per ton of base mineral aggregates, hereinafter sometimes referred to as PPT (corresponding approximately to gram per 2 kilogram):

| | |
|---|---|
| Water | 20–30 |
| Sodium silicate solution | 30–55 |
| (38% solids, $SiO_2/Na_2O$ = 2.9) | |
| Kaolin clay | 20–35 |
| Pigments | 0–15 |
| Metallic copper powder | 7–13 |

These components are combined into a slurry by using a suitable mixing equipment. The slurry is then applied to the preheated granules in a suitable apparatus to produce the individually color-coated granules.

3) Pre-drying the color-coated granules by adjusting the temperature and air flow in the apparatus to reduce their moisture contend to about 0.2 to 0.5%.
4) Kiln-firing the color-coated granules at a temperature of from about 840° F. to about 960° F. to form an insolubilized silicate-clay matrix coating in which the metallic copper powder and pigments are uniformly distributed.
5) Cooling the fired granules to a temperature of from about 200° F. to about 220° F. by means of air flow and/or water application in a suitable apparatus.
6) Treating the color-coated granules with a mixture of process oil and an organosilicone compound to impart dust control and to improve asphalt adhesion.
7) Applying the finished granules to the asphalt coated roof shingles using conventional techniques.
8) For white or buff colored granules, a two-coat coloring manufacturing process is typically employed. In this case, the metallic copper powder is preferentially distributed between both coatings or in just the outer second coating. The first coating, or primer coat, generally is only lightly pigmented and is fired between 700° F.–800° F. in accordance with steps 1–5 described above. The second coat, which contains the bulk of the pigmentation, is subsequently applied by repeating steps 1 to 6 described above.
9) For green granules containing copper polychlorophthalocyanine pigment a coating composition devoid of Kaolin clay is often used. The coating composition consists only of water, sodium silicate binder, pigments, and metallic copper powder. This is because the thermal stability of polychlorophthalocyanine pigment requires kiln firing temperatures limited to 450°

F.–550° F., which is insufficient for complete silicate/kaolin clay reaction. As a result, a suitable "pickling agent", e.g. a solution of $AlCl_3$ or $MgCl_2$, must be applied during the cooling process to chemically insolubilize the coating.

Pigments

Pigments, when used in the first or second coating may be pigments that are commercially available including: carbon black, titanium dioxide, chromium oxide, yellow iron oxide, ultramarine blue, red iron oxide, metal ferrite, and mixtures thereof.

Algicide

The preferred algicide of the present invention is a unique metallic copper powder produced by copper atomization/oxidation and hydrogen reduction of cuprous oxide. The process produces irregularly-shaped, highly-textured, sponge-like copper metal aggregates of particles size range 5–75 microns. A scanning electron micrograph (SEM) of this copper metal aggregate is shown in FIG. 1. A particularly effective material of this type is 200 RL copper powder produced by OMG, Research Triangle Park, North Carolina, that results in particles of 99% purity and of 200 mesh particle size distribution (<75 micron with an average particle size of 33 micron) with very little color tint strength when incorporated into a standard silicate/clay roofing granule coloring coating formulation. Also effective is OMG's 500 RL copper powder, which has a finer (–325 mesh=<44 micron with an average size of 18 micron) particle size distribution.

EXAMPLES

The following examples will further illustrate the present invention.

Example A

Algae-Resistant #116 Gray-Green Granules

In a laboratory pilot-plant, the following coating composition was applied to 1000 gms of rhyolite base rock that was preheated to 180°–200° F.

| | |
|---|---|
| Water | 12.5 |
| Sodium Silicate | 32.5 |
| (39% solids, $SiO_2/Na_2O$ = 2.8–3.0) | |
| Titanium Dioxide | 3.0 |
| Chrome Oxide | 1.1 |
| Ultramarine Blue | 0.9 |
| 200 RL Copper Powder | 5.0 |
| Kaolin Clay | 19.0 |
| Total: | 74.0 gms |

The mixture of granules and coating composition was placed in a sealed jar of 1 quart capacity and placed on a paint shaker for 1 minute of vigorous agitation. The coated granules were transferred to an aluminum tray and heated with a hot air gun while mixing with a large spatula to remove all solvent water from the coated granules. The dried, free-flowing granules were then sent through a small rotary kiln and fired at 840°–860° F. to produce finished granules, then a standard post-treatment of process oil and polysiloxane was applied. The resulting roofing granules are comparable to those produced commercially by large-scale manufacturing equipment and meet all established color and quality specifications.

To quantify the advantage of using the 200RL copper powder as the internal algicide, the same color gray-green granules were made using cuprous oxide instead. In this case, 5.7 gms of cuprous oxide was used in place of the 5.0 gms metallic copper powder so that the total copper content was the same. Water, sodium silicate, and kaolin loadings were kept constant. However, ultramarine blue, titanium dioxide, and chrome oxide pigment loadings were adjusted so that the finished granule color was the same and in compliance with specifications.

Example B

Algae-Resistant #341 Light Black Granules

In the same manner as in Example A, the following coating composition was applied to 1000 gms of rhyolite base rock, again preheated to 180°–200° F.

| | |
|---|---|
| Water | 15.0 |
| Sodium Silicate | 20.5 |
| (39% solids, $SiO_2/Na_2O$ = 2.8–3.0) | |
| Carbon Black | 0.4 |
| Titanium Dioxide | 1.35 |
| Chrome Oxide | 0.75 |
| 200 RL Copper Powder | 5.0 |
| Kaolin Clay | 11.7 |
| Total: | 54.7 gms |

This composition was applied and the resulting granules processed exactly as described in Example A above. A comparison of pigment requirements using cuprous oxide in place of the copper metal powder was also made.

Example C

Algae-Resistant #801 Accent Granules

In the same manner as in Example A, the following coating composition was applied to 1000 gms of rhyolite base rock, again preheated to 180°–200° F.

| | |
|---|---|
| Water | 15.0 |
| Sodium Silicate | 22.5 |
| (39% solids, $SiO_2/Na_2O$ = 2.8–3.0) | |
| Dispersant | 0.15 |
| Carbon Black | 0.1 |
| Zinc Ferrite | 0.5 |
| Chrome Oxide | 0.25 |
| 200 RL Copper Powder | 5.0 |
| Kaolin Clay | 12.2 |
| Total: | 55.7 gms |

This composition was applied and the resulting granules processed exactly as described in Example A above. A comparison of pigment requirements using cuprous oxide in place of the copper metal powder was also made.

Example D

Algae-Resistant #720 White Granules

In a laboratory pilot-plant, the following first-coat composition was applied to 1000 gms of rhyolite base rock that was preheated to 180°–200° F.

| | |
|---|---|
| Water | 17.5 |
| Sodium Silicate | 25.0 |
| (39% solids, SiO$_2$/Na$_2$O = 2.8–3.0) | |
| Titanium Dioxide | 3.5 |
| 200 RL Copper Powder | 2.5 |
| Kaolin Clay | 17.5 |
| Total: | 66.0 gms |

The composition was applied and the resulting granules processed similar to that described in Example A except that a firing temperature of 740°–760° F. was used. The fired first-coat granules were then coated with the following second-coat composition:

| | |
|---|---|
| Water | 14.0 |
| Sodium Silicate | 28.0 |
| (41% solids, SiO$_2$/Na$_2$O = 2.5) | |
| Titanium Dioxide | 4.5 |
| 200 RL Copper Powder | 2.5 |
| Kaolin Clay | 10.7 |
| Total: | 59.7 gms |

The composition was applied and the resulting granules processed as before using a kiln firing temperature of 940°–960° F. A comparison of pigment requirement using cuprous is oxide in place of the copper metal powder was made here as well.

Performance Evolution Data

A. Roofing Granule Quality

Standard roofing granule quality test results for the experimental granules produced in Examples A through D were all in compliance with prevailing specifications and comparable to those of standard granules with respect to the following parameters:

1) Color—the conformance to established roofing granule product color specifications.
2) Alkalinity—a measure of the degree of silicate/clay insolubilization achieved with the colored algae-retardant coating application process.
3) Bloom—the absence of discoloring soluble salt often produced during the coating insolubilization process.
4) Fixation—the abrasion resistance of the pigmented algae-retardant coating.
5) Asphalt affinity—the wettability of finished granules by molten asphalt, an indication of adhesion potential.
6) Water Repellency—the resistance of finished granules to wetting by water.
7) Stain Resistance—the resistance of finished granules to staining by asphaltic components.

B. Coloring Cost Comparison: 200RL vs. Cuprous Oxide

For the granules of Example A, replacement of the 5.0 gm 200RL copper powder with 5.7 gm cuprous oxide required a 200% increase in titanium dioxide, a 173% increase in chrome oxide, an 11% increase in ultramarine blue to achieve A-116 color specifications. This represents a pigment cost penalty ranging $18–$24 per ton of finished granules.

For the granules of Example B, replacement of the 5.0 gm 200RL copper powder with 5.7 gm cuprous oxide required a 48% increase in titanium dioxide, a 33% increase in chrome oxide, and inclusion of 1.0 PPT ultramarine blue to achieve A-341 color specifications. This represent a pigment cost penalty ranging $3–$5/ton of finished granules.

For the granules of Example C, replacement of the 5.0 gm 200RL copper powder with 5.7 gm cuprous oxide required a 120% increase in zinc ferrite, a 300% increase in chrome oxide, and inclusion of 3.5 PPT titanium dioxide to achieve A-801 color specifications. This represent a pigment cost penalty ranging $7–$9/ton of finished granules.

For the granules of Example D, replacement of the 5.0 gm 200RL copper powder with 5.7 gm cuprous oxide required a 213% increase in titanium dioxide, to achieve A-720 color specifications. This represent a pigment cost penalty ranging $28–$34/ton of finished granules.

C. Copper Leach Rate Measurement

Figure 2:
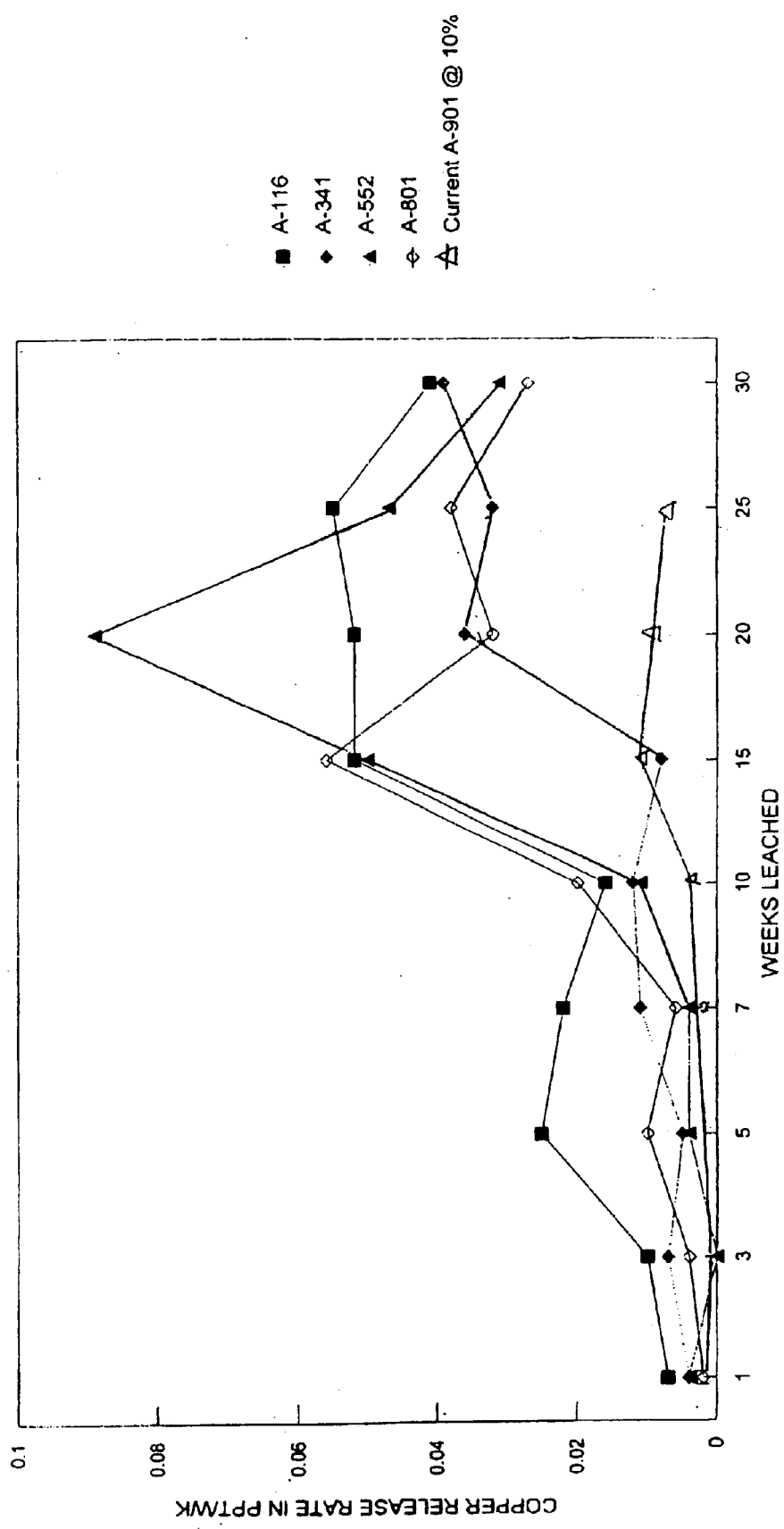
FIG. 2 shows copper release rate in parts per ton (PPT) per weeks.

Algae-resistant #116 Gray-Green, #341 Light Black, #552 Brown and #801 Accent granules were produced in a laboratory pilot plant using formulations and processing conditions similar to that described in Examples A, B, C, except that 3.5 gm of 200RL copper powder was used for every 1000 gm of rhyolite base coated. The finished granules were placed in Soxhlet Extractors and copper leach rates determined over a 25 week period. The copper release profiled for these products is shown graphically against that of a 10% blend of standard A-901 control granules with 90% standard A-801 (non-algicidal) granules. A-901 is a standard multi-coat, algae-resistant, accent-colored product containing a high cuprous oxide loading and is designed for blending with standard granules. In this case, the total copper content of the 10% A-901 blend is equal to the copper content of the 200RL-formulated products. The leach rates in FIG. 2 show that all 200RL-formulated products have copper leach rates significantly higher than that of the control blend.

D. Field Performance Data

Algae-resistant #720 white granules were produced in a laboratory pilot plant using formulations and processing conditions similar to that described in Example D, except that a total of 3.5 gm of 200RL copper powder was used for every 1000 gm of rhyolite base coated. The finished granules were used to make standard 3-tab shingles at a commercial shingle plant. The resulting shingles were applied to a plywood exposure board with a strip of seed shingle (heavily infested with blue-green algae) mounted at the top of the shingle rows. A control seed board containing similar shingles surfaced with a 10% blend of standard A-902 and 90% standard A-720 (non-algicidal) granules was also exposed in the same location. A-902 is a standard, multi-coat, algae-resistant, light-colored product containing a high cuprous oxide loading and is designed for blending with standard granules. In this case, the total copper content of the 10% A-902 blend is equal to the copper content of the 200RL-formulated #720 white product. After 3 years of heavy seed exposure in South Florida, the A-902 control blend exhibited a moderate algae discoloration whereas the 200RL-formulated #720 remained completely clean.

Various modifications of the present invention will become apparent to those skilled in the art without departing from the spirit and scope of the invention as defined in the appendent claims.

What is claimed is:

1. Algae-retardant roofing granules having enhanced ability over an extended period of time to release ions to prevent or inhibit the growth of algae and fungi upon atmospheric exposure of roofing surfaces coated with such granules comprising:

a) a base material of crushed mineral aggregates in the form of granules coated with:

b) a single layer of semi-ceramic composition consisting of a fired silicate-clay matrix containing about 0 to about 25 pounds of pigment per ton of base material; and from about 2 pounds to about 20 pounds of metallic copper powder having a particle size range of from about 5 to about 75 microns.

2. The algae-retardant roofing granules of claim 1 wherein said silicate-clay matrix contains from about 0.5 pounds to 20 pounds of pigment per ton of base material; and from about 7 pounds to about 13 pounds of metallic copper powder.

3. The algae-retardant roofing granules of claim 1 wherein said metallic copper powder has an average particle size of from about 5 to 50 microns.

4. The algae-retardant roofing granules of claim 1 wherein said pigment is selected from the group consisting of: carbon black, titanium dioxide, chromium oxide, yellow iron oxide, ultramarine blue, zinc sulfide, red iron oxide and metallic ferrites.

5. Algae-retardant roofing granules having enhanced ability over an extended period of time to release algicidal ions to prevent or inhibit the growth of algae and fungi upon atmospheric exposure of roofing surfaces coated with such granules comprising:
   a) a base material of crushed mineral aggregates in the form of granules coated with:
   b) a first or inner layer of semi-ceramic composition consisting of a fired silicate-clay matrix containing from about 0 to about 25 pounds of pigment per ton of base material; and from about 2 pounds to about 20 pounds of metallic copper powder having a particle size range of from about 5 to about 75 microns; and
   c) a second layer of semi-ceramic composition, coated on the first or inner layer of the semi-ceramic composition, consisting of a fired silicate-clay matrix containing: of from about 0 to about 25 pounds of pigment per ton of base material; and from about 2 pounds to about 20 pounds of metallic copper powder.

6. The algae-retardant roofing granules of claim 5 wherein said silicate-clay matrix contains from about 0.5 pounds to 20 pounds of pigment, and from about 7 pounds to about 13 pounds of metallic copper powder.

7. The algae-retardant roofing granules of claim 5 wherein said metallic copper powder has an average particle size of from about 5 to 50 microns.

8. The algae-retardant roofing granules of claim 5 wherein said pigment is selected from the group consisting of: carbon black, titanium dioxide, chromium oxide, yellow iron oxide, ultramarine blue, zinc sulfide, red iron oxide and metallic ferrites.

9. A process of preparing algae-retardant roofing granules comprising the steps of:
   a) crushing and sizing a base mineral aggregate to form granules therefrom;
   b) preheating the granules to about 210° F.–230° F.;
   c) coating the preheated granules with a single coat of semi-ceramic composition of an aqueous slurry comprising: about 30–55 pounds of 38% solids sodium silicate solution per ton of said base mineral aggregate; about 20–35 pounds Kaolin clay per ton of said base mineral aggregate; about 0–15 pounds of a pigment, and about 2–20 pounds of metallic copper powder;
   d) pre-drying the single-coated granules to a moisture content of about 0.2% to 0.5%;
   e) kiln-firing the pre-dried granules at a temperature of from about 840° F. to 960° F. to form an insolubilized silicate-clay matrix coating in which the metallic copper powder and the pigment are uniformly distributed;
   f) cooling the kiln-fired granules to a temperature of from about 200° F. to about 220° F.; and
   g) treating the granules with a mixture of a process oil and an organosilicone compound to impart dust control and adhesion to a substrate.

10. Roofing shingles prepared by a process of preparing roofing shingles consisting of a substrate and colored roofing granules embedded in the substrate comprising the steps of:
   a) crushing and sizing a base mineral aggregate to form granules therefrom;
   b) preheating the granules to about 210° F.–230° F.
   c) coating the preheated granules with a single coat of semi-ceramic composition of an aqueous slurry comprising: about 30–55 pounds of 38% solids sodium silicate solution per ton of said base mineral aggregate; about 20–35 pounds Kaolin clay per ton of said base mineral aggregate; about 0–15 pounds of a pigment, and about 2–20 pounds of metallic copper powder;
   d) pre-drying the single-coated granules to a moisture content of about 0.2% to 0.5%;
   e) kiln-firing the pre-dried granules at a temperature of from about 840° F. to 960° F. to form an insolubilized silicate-clay matrix coating in which the metallic copper powder and the pigment are uniformly distributed;
   f) cooling the kiln-fired granules to a temperature of from about 200° F. to about 220° F.; and
   g) treating the granules with a mixture of a process oil and an organosilicone compound to impart dust control and adhesion to a substrate, wherein said substrate comprises an organic asphalt saturated felt material.

11. A method of protecting asphalt roof shingles against algae and fungi comprising the steps of:
   a) providing asphalt coated roof shingles;
   b) crushing and sizing a base mineral aggregate to form granules therefrom;
   c) preheating the granules to about 210° F.–230° F.
   d) coating the preheated granules with a single coat of semi-ceramic composition of an aqueous slurry comprising: about 30–55 pounds of 38% solids sodium silicate solution per ton of said base mineral aggregate; about 20–35 pounds Kaolin clay per ton of said base mineral aggregate; about 0–15 pounds of a pigment, and about 2–20 pounds of metallic copper powder;
   e) pre-drying the single-coated granules to a moisture content of about 0.2% to 0.5%;
   f) kiln-firing the pre-dried granules at a temperature of from about 840° F. to 960° F. to form an insolubilized silicate-clay matrix coating in which the metallic copper powder and the pigment are uniformly distributed;
   g) cooling the kiln-fired granules to a temperature of from about 200° F. to about 220° F.;
   h) treating the granules with a mixture of a process oil and an organosilicone compound to impart dust control and adhesion to a substrate; and
   i) applying said treated granules to said roof shingles to obtain algae- and fungi-resistant roof shingles.

12. A process of preparing algae-retardant roofing granules comprising the steps of:
   a) crushing and sizing a base mineral aggregate to form granules therefrom;
   b) preheating the granules to about 210° F.–230° F.;
   c) coating the preheated granules with a first or inner coat of semi-ceramic composition of an aqueous slurry comprising: about 30–60 pounds of 38% solids sodium silicate solution per ton of said base mineral aggregate; about 25–40 pounds Kaolin clay per ton of said base mineral aggregate; about 0–15 pounds of a pigment; and about 2–20 pounds of metallic copper powder;

d) pre-drying the single-coated granules to a moisture content of about 0.2% to 0.5%;

e) kiln-firing the pre-dried granules at a temperature of from about 700° F. to 960° F. to form an insolubilized silicate-clay matrix coating in which the metallic copper powder and the pigment are uniformly distributed;

f) cooling the kiln-fired granules to a temperature of from about 200° F. to about 220° F.;

g) coating the cooled granules with a second coat of a semi-ceramic composition of an aqueous slurry comprising: about 30 to 60 pounds of 38% solid sodium silicate solution per ton of said base mineral aggregate; about 20 to 30 pounds Kaolin clay per ton of said base mineral aggregate; about 0–15 pounds of a pigment; and about 2–20 pounds of metallic copper powder;

h) pre-drying the double coated granules to a moisture content of about 0.2 to 0.5%;

i) kiln-firing the pre-dried granules at a temperature of from about 840° F. to 960° F. to form an insolubilized silicate-clay matrix coating in which the metallic copper powder and the pigment are uniformly distributed;

j) cooling the kiln-fired granules to a temperature of from about 200° F. to about 220° F.; and k) treating the granules with a mixture of a process oil and an organosilicone compound to impart dust control and adhesion to a substrate.

13. Roofing shingles prepared by a process of preparing roofing shingles consisting of a substrate and colored roofing granules embedded in the substrate comprising the steps of:

a) crushing and sizing a base mineral aggregate to form granules therefrom;

b) preheating the granules to about 210° F.–230° F.;

c) coating the preheated granules with a first or inner coat of semi-ceramic composition of an aqueous slurry comprising: about 30–60 pounds of 38% solids sodium silicate solution per ton of said base mineral aggregate; about 25–40 pounds Kaolin clay per ton of said base mineral aggregate; about 0–15 pounds of a pigment, and about 2–20 pounds of metallic copper powder;

d) pre-drying the single-coated granules to a moisture content of about 0.2% to 0.5%;

e) kiln-firing the pre-dried granules at a temperature of from about 700° F. to 960° F. to form an insolubilized silicate-clay matrix coating in which the metallic copper powder and the pigment are uniformly distributed;

f) cooling the kiln-fired granules to a temperature of from about 200° F. to about 220° F.;

g) coating the cooled granules with a second coat of a semi-ceramic composition of an aqueous slurry comprising: about 30 to 60 pounds of 38% solid sodium silicate solution per ton of said base mineral aggregate; about 20 to 30 pounds Kaolin clay per ton of said base mineral aggregate; about 0–15 pounds of a pigment, and about 2–20 pounds of metallic copper powder;

h) pre-drying the double coated granules to a moisture content of about 0.2 to 0.5%;

i) kiln-firing the pre-dried granules at a temperature of from about 840° F. to 960° F. to form an insolubilized silicate-clay matrix coating in which the metallic copper powder and the pigment are uniformly distributed;

j) cooling the kiln-fired granules to a temperature of from about 200° F. to about 220° F.; and k) treating the granules with a mixture of a process oil and an organosilicone compound to impart dust control and adhesion to a substrate, wherein said substrate comprises an organic asphalt saturated felt material.

14. A method of protecting asphalt-coated roof shingles against algae and fungi comprising the steps of:

a) providing asphalt-coated roof shingles;

b) crushing and sizing a base mineral aggregate to form granules therefrom;

c) preheating the granules to about 210° F.–230° F.;

d) coating the preheated granules with a first or inner coat of semi-ceramic composition of an aqueous slurry comprising: about 30–60 pounds of 38% solids sodium silicate solution per ton of said base mineral aggregate; about 25–40 pounds Kaolin clay per ton of said base mineral aggregate; about 0–15 pounds of a pigment; and about 2–20 pounds of metallic copper powder;

e) pre-drying the single-coated granules to a moisture content of about 0.2% to 0.5%;

f) kiln-firing the pre-dried granules at a temperature of from about 700° F. to 960° F. to form an insolubilized silicate-clay matrix coating in which the metallic copper powder and the pigment are uniformly distributed;

g) cooling the kiln-fired granules to a temperature of from about 200° F. to about 220° F.;

h) coating the cooled granules with a second coat of a semi-ceramic composition of an aqueous slurry comprising: about 30 to 60 pounds of 38% solid sodium silicate solution per ton of said base mineral aggregate; about 20 to 30 pounds Kaolin clay per ton of said base mineral aggregate; about 0–15 pounds of a pigment, and about 2–20 pounds of metallic copper powder;

i) pre-drying the double coated granules to a moisture content of about 0.2 to 0.5%;

j) kiln-firing the pre-dried granules at a temperature of from about 840° F. to 960° F. to form an insolubilized silicate-clay matrix coating in which the metallic copper powder and the pigment are uniformly distributed;

k) cooling the kiln-fired granules to a temperature of from about 200° F. to about 220° F.; and l) treating the granules with a mixture of a process oil and an organosilicone compound to impart dust control and adhesion to a substrate; and m) applying said treated granules to said roof shingles to obtain algae- and fungi-resistant roof shingles.

15. A process of preparing algae-retardant green granules containing copper polychlorophthalocyanine pigment comprising the steps of:

a) crushing and sizing a base mineral aggregate to form granules therefrom;

b) preheating the granules to about 170° F.–200° F.;

c) coating the preheated granules with a semi-ceramic composition of an aqueous slurry comprising: about 30–55 pounds of 38% solids sodium silicate solution per ton of said base mineral aggregate; about 0–15 pounds of a pigment; and about 2–20 pounds of metallic copper powder;

d) pre-drying the first or inner coated granules to a moisture content of about 0.2% to 0.5%;

e) kiln-firing the pre-dried granules at a temperature of from about 450° F. to 550° F.;

f) cooling the kiln-fired granules to a temperature of from about 200° F. to about 220° F.; in the presence of an $AlCl_3$ or $MgCl_2$ solution to chemically insolubilize said coating; and g) treating the granules with a mixture of a process oil and an organosilicone compound to impart dust control and adhesion to a substrate.

16. A method of protecting asphalt-coated roof shingles against algae and fungi comprising the steps of:

a) providing asphalt-coated roof shingles;

b) crushing and sizing a base mineral aggregate to form granules therefrom;

c) preheating the granules to about 170° F.–200° F.;

d) coating the preheated granules with a first or inner coat of semi-ceramic composition of an aqueous slurry comprising: about 30–55 pounds of 38% solids sodium silicate solution per ton of said base mineral aggregate; about 0–15 pounds of a pigment; and about 2–20 pounds of metallic copper powder;

e) pre-drying the first or inner coated granules to a moisture content of about 0.2% to 0.5%;

f) kiln-firing the pre-dried granules at a temperature of from about 450° F. to 550° F.;

g) cooling the kiln-fired granules to a temperature of from about 200° F. to about 220° F.; in the presence of an $AlCl_3$ or $MgCl_2$ solution to chemically insolubilize said coating;

h) treating the granules with a mixture of a process oil and an organosilicone compound to impart dust control and adhesion to a substrate; and i) applying said treated granules to said roof shingles to obtain algae- and fungi-resistant roof shingles.

* * * * *